US011675775B2

(12) United States Patent
Neumeier

(10) Patent No.: US 11,675,775 B2
(45) Date of Patent: Jun. 13, 2023

(54) SYSTEMS AND METHODS FOR IMPROVING ACCURACY OF DEVICE MAPS USING MEDIA VIEWING DATA

(71) Applicant: INSCAPE DATA, INC., Irvine, CA (US)

(72) Inventor: Zeev Neumeier, Berkeley, CA (US)

(73) Assignee: INSCAPE DATA, INC., Irvine, CA (US)

( * ) Notice: Subject to any disclaimer, the term of this patent is extended or adjusted under 35 U.S.C. 154(b) by 90 days.

(21) Appl. No.: 17/206,973

(22) Filed: Mar. 19, 2021

(65) Prior Publication Data

US 2021/0279231 A1    Sep. 9, 2021

Related U.S. Application Data

(63) Continuation of application No. 15/946,478, filed on Apr. 5, 2018, now Pat. No. 10,983,984.

(Continued)

(51) Int. Cl.
| | |
|---|---|
| *G06F 16/783* | (2019.01) |
| *H04N 21/442* | (2011.01) |
| *G06V 20/40* | (2022.01) |
| *G06F 16/23* | (2019.01) |
| *G06F 16/28* | (2019.01) |
| *H04L 65/80* | (2022.01) |

(Continued)

(52) U.S. Cl.
CPC ........ *G06F 16/2365* (2019.01); *G06F 16/285* (2019.01); *G06F 16/7837* (2019.01);
(Continued)

(58) Field of Classification Search
CPC ......... H04N 21/44222; H04N 21/4667; H04N 21/442; H04N 21/44213;
(Continued)

(56) References Cited

U.S. PATENT DOCUMENTS

| | | | | |
|---|---|---|---|---|
| 5,945,988 A | * | 8/1999 | Williams | ............... H04H 60/46 348/E17.005 |
| 10,983,984 B2 | | 4/2021 | Neumeier | |
| | | (Continued) | | |

FOREIGN PATENT DOCUMENTS

| | | | | | |
|---|---|---|---|---|---|
| CA | 2936636 A1 | * | 7/2007 | ............. | H04H 60/65 |
| EP | 2247007 A1 | * | 11/2010 | ............. | H04H 60/31 |
| | (Continued) | | | | |

OTHER PUBLICATIONS

International Search Report and Written Opinion for PCT Application No. PCT/US2018/026289 dated Jul. 19, 2018; 9 pages.

(Continued)

*Primary Examiner* — Robert J Hance
(74) *Attorney, Agent, or Firm* — Polsinelli LLP

(57) ABSTRACT

Provided are methods, devices, and computer-program products for determining an accuracy score for a device mapping system. In some examples, the accuracy score can be based on a device map of the device mapping system and viewing data from an automated content recognition component. In such examples, the accuracy score can indicate whether the device mapping system is assigning similar categories to devices that have similar player of media content. In some examples, a device map can be determined to be random, indicating that the device mapping system is inaccurate. In contrast, if the device map is determined to have a sufficiently low probability of being merely random in nature, the device mapping system can be determined to be accurate.

17 Claims, 13 Drawing Sheets

Related U.S. Application Data

(60) Provisional application No. 62/482,495, filed on Apr. 6, 2017.

(51) Int. Cl.
*H04N 21/466* (2011.01)
*H04L 65/612* (2022.01)

(52) U.S. Cl.
CPC ............ *G06V 20/40* (2022.01); *H04L 65/612* (2022.05); *H04L 65/80* (2013.01); *H04N 21/442* (2013.01); *H04N 21/44213* (2013.01); *H04N 21/44222* (2013.01); *H04N 21/4667* (2013.01)

(58) Field of Classification Search
CPC . G06K 9/00711–00765; G06F 9/00711; G06F 16/2365; G06F 16/285; G06F 16/7837; G06V 20/40; H04L 65/612; H04L 65/80
See application file for complete search history.

(56) References Cited

U.S. PATENT DOCUMENTS

| | | | | |
|---|---|---|---|---|
| 2002/0198762 | A1* | 12/2002 | Donato | H04H 60/45 725/24 |
| 2013/0046772 | A1 | 2/2013 | Gu | |
| 2013/0205325 | A1* | 8/2013 | Sinha | H04N 21/4532 725/23 |
| 2014/0282670 | A1* | 9/2014 | Sinha | H04N 21/23424 725/19 |
| 2015/0189500 | A1* | 7/2015 | Bosworth | H04N 21/2351 709/201 |
| 2016/0050457 | A1* | 2/2016 | Mondal | H04N 21/44204 725/18 |
| 2016/0125471 | A1* | 5/2016 | Hsu | G06Q 30/0269 705/14.66 |
| 2017/0031907 | A1 | 2/2017 | Juang et al. | |
| 2017/0054819 | A1* | 2/2017 | Huffaker | G06Q 30/0255 |
| 2017/0142465 | A1* | 5/2017 | Ray | G06Q 30/0264 |
| 2018/0084308 | A1* | 3/2018 | Lopatecki | H04H 60/82 |
| 2021/0168389 | A1* | 6/2021 | Meardi | H04N 5/76 |

FOREIGN PATENT DOCUMENTS

| | | | | |
|---|---|---|---|---|
| WO | 2014/142758 | A1 | 9/2014 | |
| WO | WO-2014142758 | A1 * | 9/2014 | ......... G06Q 30/0241 |
| WO | 2018/187592 | A1 | 10/2018 | |

OTHER PUBLICATIONS

Notice of Allowance dated Dec. 24, 2020 for U.S. Appl. No. 15/946,478; 9 pages.

\* cited by examiner

Source A

| Source of Variation | SS | df | MS | F | P-value | F crit |
|---|---|---|---|---|---|---|
| Between Groups | 41381.42052 | 1194 | 34.65780613 | 3.498857614 | 0 | 1.069018384 |
| Within Groups | 580014.4111 | 58555 | 9.905463429 | | | |
| Total | 621395.8316 | 59749 | | | | |

Source B

| Source of Variation | SS | df | MS | F | P-value | F crit |
|---|---|---|---|---|---|---|
| Between Groups | 10.13559025 | 49 | 0.206848781 | 0.109764426 | 1 | 1.3591835 |
| Within Groups | 4616.974095 | 2450 | 1.884479222 | | | |
| Total | 4627.109685 | 2499 | | | | |

Source C

| Source of Variation | SS | df | MS | F | P-value | F crit |
|---|---|---|---|---|---|---|
| Between Groups | 2929.692483 | 329 | 8.904840375 | 1.831348698 | 7.89651E-18 | 1.133186882 |
| Within Groups | 78625.80677 | 16170 | 4.862449398 | | | |
| Total | 81555.49925 | 16499 | | | | |

The F-tests says that the match is random if F < Fcrit

Accordingly, Source A and Source B pass the test with F > Fcrit

Source C fails the test

```
FOR EACH DEVICE INDICATED BY A DEVICE MAPPING SYSTEM, CALCULATE A NUMBER
OF HOURS TUNED TO EACH CHANNEL
510
```

```
PERFORM A STATISTICAL ANALYSIS FOR THE NUMBER OF HOURS FOR EACH DEVICE TO
IDENTIFY HOW CHANNEL VIEWING VARIES BETWEEN EACH SEGMENT INDICATED BY THE
DEVICE MAPPING SYSTEM
520

DETERMINE THAT THE SEGMENTS ARE POORLY IDENTIFIED BY THE DEVICE MAPPING
  SYSTEM WHEN THERE IS A LOW AMOUNT OF VARIANCE BETWEEN THE SEGMENTS
  530

DETERMINE THAT THE SEGMENTS CORRELATE TO VIEWING BEHAVIORS WHEN THERE
  IS A HIGH AMOUNT OF VARIANCE BETWEEN THE SEGMENTS
  540

PERFORM AN F-TEST TO DETERMINE WHETHER THERE IS A LOW AMOUNT OR A HIGH
  AMOUNT OF VARIANCE BETWEEN THE SEGMENTS
  550
```

FIG. 5

First Match                      47% match rate

Income Codes vr TV Viewing hours per month probablity of random           9.15E-17

| Sum of count | Column Labels | | | | | | | | |
|---|---|---|---|---|---|---|---|---|---|
| Row Labels | 0 | 100 | 200 | 300 | 400 | 500 | 600 | 700 (blank) | Grand Total |
| A | 187 | 342 | 217 | 93 | 47 | 13 | 12 | 5 | 916 |
| B | 255 | 445 | 254 | 122 | 47 | 15 | 8 | 5 | 1151 |
| C | 270 | 448 | 257 | 131 | 68 | 22 | 6 | 10 | 1212 |
| D | 349 | 622 | 356 | 195 | 90 | 22 | 14 | 5 | 1653 |
| E | 1097 | 1826 | 1062 | 568 | 238 | 79 | 31 | 19 | 4920 |
| F | 1145 | 1685 | 960 | 444 | 193 | 50 | 25 | 21 | 4523 |
| G | 670 | 969 | 535 | 234 | 107 | 31 | 11 | 8 | 2565 |
| H | 448 | 600 | 287 | 153 | 44 | 12 | 4 | 4 | 1552 |
| I | 213 | 292 | 136 | 59 | 22 | 5 | 8 | 4 | 739 |
| J | 204 | 241 | 107 | 53 | 13 | 8 | 3 | 3 | 632 |
| K | 150 | 229 | 92 | 48 | 20 | 3 | 5 | 1 | 548 |
| L | 254 | 266 | 134 | 72 | 22 | 7 | 6 | 2 | 763 |
| Not Matched (blank) | 5940 | 9039 | 4939 | 2404 | 993 | 304 | 108 | 91 | 23818 |
| Grand Total | 11182 | 17004 | 9336 | 4576 | 1904 | 571 | 241 | 178 | 44992 |

| Sum of count | Column Labels | | | | | | | | |
|---|---|---|---|---|---|---|---|---|---|
| Row Labels | 0 | 100.00 | 200.00 | 300.00 | 400.00 | 500.00 | 600.00 | 700.00 (blank) | Grand Total |
| A | 227.66 | 346.19 | 190.07 | 93.16 | 38.76 | 11.63 | 4.91 | 3.62 | 916.00 |
| B | 286.06 | 435.00 | 238.84 | 117.06 | 48.71 | 14.61 | 6.17 | 4.55 | 1151.00 |
| C | 301.22 | 458.06 | 251.49 | 123.27 | 51.29 | 15.38 | 6.49 | 4.79 | 1212.00 |
| D | 410.83 | 624.72 | 343.00 | 168.12 | 69.95 | 20.98 | 8.85 | 6.54 | 1653 |
| E | 1222.78 | 1859.43 | 1020.92 | 500.40 | 208.21 | 62.44 | 26.35 | 19.46 | 4920 |
| F | 1124.12 | 1709.39 | 938.54 | 460.02 | 191.41 | 57.40 | 24.23 | 17.89 | 4523 |
| G | 637.49 | 969.40 | 532.25 | 260.88 | 108.55 | 32.55 | 13.74 | 10.15 | 2565 |
| H | 385.72 | 586.55 | 322.05 | 157.85 | 65.68 | 19.70 | 8.31 | 6.14 | 1552 |
| I | 183.67 | 279.29 | 153.35 | 75.16 | 31.27 | 9.38 | 3.96 | 2.92 | 739 |
| J | 157.07 | 238.85 | 131.14 | 64.28 | 26.75 | 8.02 | 3.39 | 2.50 | 632 |
| K | 136.20 | 207.11 | 113.71 | 55.74 | 23.19 | 6.95 | 2.94 | 2.17 | 548 |
| L | 189.63 | 288.36 | 158.33 | 77.60 | 32.29 | 9.68 | 4.09 | 3.02 | 763 |
| Not Matched (blank) | 5919.56 | 9001.63 | 4942.32 | 2422.46 | 1007.95 | 302.28 | 127.58 | 94.23 | 23818 |
| Grand Total | 11182 | 17004 | 9336 | 4576 | 1904 | 571 | 241 | 178 | 44992 | p           9.14877E-17

FIG. 9

Second Match            62% match rate

Income Codes vr TV Viewing hours per month probablity of random        4.47E-20

| Sum of count | Column Labels | | | | | | | | |
|---|---|---|---|---|---|---|---|---|---|
| Row Labels | 0 | 100 | 200 | 300 | 400 | 500 | 600 | 700 (blank) | Grand Total |
| A | 270 | 451 | 280 | 138 | 73 | 20 | 10 | 6 | 1248 |
| B | 360 | 606 | 362 | 181 | 69 | 23 | 9 | 7 | 1617 |
| C | 377 | 604 | 372 | 190 | 88 | 28 | 16 | 11 | 1686 |
| D | 486 | 817 | 448 | 248 | 112 | 32 | 16 | 8 | 2167 |
| E | 1456 | 2453 | 1428 | 755 | 312 | 106 | 37 | 29 | 6576 |
| F | 1481 | 2187 | 1266 | 581 | 247 | 64 | 30 | 25 | 5881 |
| G | 848 | 1269 | 718 | 326 | 130 | 46 | 17 | 12 | 3366 |
| H | 581 | 780 | 382 | 179 | 66 | 23 | 6 | 5 | 2022 |
| I | 275 | 383 | 185 | 95 | 30 | 9 | 7 | 4 | 988 |
| J | 261 | 322 | 153 | 68 | 18 | 10 | 4 | 3 | 839 |
| K | 191 | 300 | 126 | 61 | 28 | 5 | 6 | 2 | 719 |
| L | 340 | 353 | 170 | 94 | 25 | 9 | 8 | 2 | 1001 |
| Not Matched | 4256 | 6479 | 3446 | 1660 | 706 | 196 | 75 | 64 | 16882 |
| (blank) | | | | | | | | | |
| Grand Total | 11182 | 17004 | 9336 | 4576 | 1904 | 571 | 241 | 178 | 44992 |

| Sum of count | Column Labels | | | | | | | | |
|---|---|---|---|---|---|---|---|---|---|
| Row Labels | 0 | 100 | 200 | 300 | 400 | 500 | 600 | 700 (blank) | Grand Total |
| A | 310.17 | 471.66 | 258.96 | 126.93 | 52.81 | 15.84 | 6.68 | 4.94 | 1248 |
| B | 401.88 | 611.12 | 335.53 | 164.46 | 68.43 | 20.52 | 8.66 | 6.40 | 1617 |
| C | 419.03 | 637.20 | 349.85 | 171.48 | 71.35 | 21.40 | 9.03 | 6.67 | 1686 |
| D | 538.57 | 818.98 | 449.66 | 220.40 | 91.70 | 27.50 | 11.61 | 8.57 | 2167 |
| E | 1634.35 | 2485.29 | 1364.54 | 668.83 | 278.29 | 83.46 | 35.22 | 26.02 | 6576 |
| F | 1461.62 | 2222.63 | 1220.33 | 598.14 | 248.88 | 74.64 | 31.50 | 23.27 | 5881 |
| G | 836.56 | 1272.13 | 698.46 | 342.35 | 142.44 | 42.72 | 18.03 | 13.32 | 3366 |
| H | 502.53 | 764.18 | 419.57 | 205.65 | 85.57 | 25.66 | 10.83 | 8.00 | 2022 |
| I | 245.55 | 373.40 | 205.01 | 100.49 | 41.81 | 12.54 | 5.29 | 3.91 | 988 |
| J | 208.52 | 317.09 | 174.10 | 85.33 | 35.51 | 10.65 | 4.49 | 3.32 | 839 |
| K | 178.70 | 271.73 | 149.20 | 73.13 | 30.43 | 9.12 | 3.85 | 2.84 | 719 |
| L | 248.78 | 378.31 | 207.71 | 101.81 | 42.36 | 12.70 | 5.36 | 3.96 | 1001 |
| Not Matched | 4195.74 | 6380.28 | 3503.08 | 1717.02 | 714.42 | 214.25 | 90.43 | 66.79 | 16882 |
| (blank) | | | | | | | | | |
| Grand Total | 11182 | 17004 | 9336 | 4576 | 1904 | 571 | 241 | 178 | 44992 | p          4.46522E-20

FIG. 10

TVs only found in set 2
Income Codes vr TV Viewing hours per month probablity of random        6.84E-03

| Sum of count | Column Labels | | | | | | | | |
|---|---|---|---|---|---|---|---|---|---|
| Row Labels | 0 | 100 | 200 | 300 | 400 | 500 | 600 | 700 (blank) | Grand Total |
| A | 89 | 114 | 63 | 42 | 22 | 7 | 2 | 2 | 341 |
| B | 109 | 185 | 101 | 64 | 21 | 8 | 1 | 2 | 491 |
| C | 108 | 167 | 117 | 56 | 26 | 8 | 8 | 1 | 491 |
| D | 136 | 213 | 113 | 63 | 30 | 12 | 3 | 3 | 573 |
| E | 383 | 642 | 373 | 193 | 80 | 28 | 9 | 8 | 1716 |
| F | 360 | 515 | 317 | 148 | 44 | 14 | 6 | 6 | 1410 |
| G | 183 | 299 | 185 | 89 | 25 | 14 | 5 | 4 | 804 |
| H | 129 | 199 | 98 | 29 | 20 | 11 | 2 | 1 | 489 |
| I | 58 | 98 | 48 | 37 | 8 | 4 | | | 253 |
| J | 68 | 82 | 46 | 17 | 6 | 3 | 1 | | 223 |
| K | 43 | 73 | 33 | 12 | 9 | 1 | 1 | 1 | 173 |
| L | 88 | 88 | 37 | 16 | 6 | 2 | 2 | | 239 |
| (blank) | | | | | | | | | |
| Grand Total | 1754 | 2675 | 1531 | 766 | 297 | 112 | 40 | 28 | 7203 |

| Sum of count | Column Labels | | | | | | | | |
|---|---|---|---|---|---|---|---|---|---|
| Row Labels | 0 | 100 | 200 | 300 | 400 | 500 | 600 | 700 (blank) | Grand Total |
| A | 83.04 | 126.64 | 72.48 | 36.26 | 14.06 | 5.30 | 1.89 | 1.33 | 341 |
| B | 119.56 | 182.34 | 104.36 | 52.22 | 20.25 | 7.63 | 2.73 | 1.91 | 491 |
| C | 119.56 | 182.34 | 104.36 | 52.22 | 20.25 | 7.63 | 2.73 | 1.91 | 491 |
| D | 139.53 | 212.80 | 121.79 | 60.94 | 23.63 | 8.91 | 3.18 | 2.23 | 573 |
| E | 417.86 | 637.28 | 364.74 | 182.49 | 70.76 | 26.68 | 9.53 | 6.67 | 1716 |
| F | 343.35 | 523.64 | 299.70 | 149.95 | 58.14 | 21.92 | 7.83 | 5.48 | 1410 |
| G | 195.78 | 298.58 | 170.89 | 85.50 | 33.15 | 12.50 | 4.46 | 3.13 | 804 |
| H | 119.08 | 181.60 | 103.94 | 52.00 | 20.16 | 7.60 | 2.72 | 1.90 | 489 |
| I | 61.61 | 93.96 | 53.78 | 26.91 | 10.43 | 3.93 | 1.40 | 0.98 | 253 |
| J | 54.30 | 82.82 | 47.40 | 23.71 | 9.19 | 3.47 | 1.24 | 0.87 | 223 |
| K | 42.13 | 64.25 | 36.77 | 18.40 | 7.13 | 2.69 | 0.96 | 0.67 | 173 |
| L | 58.20 | 88.76 | 50.80 | 25.42 | 9.85 | 3.72 | 1.33 | 0.93 | 239 |
| (blank) | | | | | | | | | |
| Grand Total | 1754 | 2675 | 1531 | 766 | 297 | 112 | 40 | 28 | 7203 | p        7.E-03

FIG. 11

SYSTEMS AND METHODS FOR IMPROVING ACCURACY OF DEVICE MAPS USING MEDIA VIEWING DATA

CROSS-REFERENCE TO RELATED APPLICATIONS

This application is a continuation of U.S. patent application Ser. No. 15/946,478, filed Apr. 5, 2018, which claims the benefit of U.S. Provisional Patent Application No. 62/482,495, filed Apr. 6, 2017, both of which are incorporated herein by reference in their entirety for all purposes.

FIELD

The present disclosure relates generally to improving accuracy of data derived from analysis of connected devices and their association with particular categories.

BACKGROUND

Users are increasingly accessing media across a range of devices. However, determining which devices are associated with particular users can be difficult. Many systems exist that purport to map devices to particular categories (sometimes referred to as device mapping or device graphing). For example, a device mapping system can generate a device map indicating that a first device and a second device belong to a particular category. In some examples, the devices can me mapped to a particular user based on the categories assigned to each device. In other examples, the devices are assigned into a household-wide device map. However, accuracy of the device map is difficult to assess. Therefore, there is a need in the art to determine and improve the accuracy of device maps.

SUMMARY

Provided are methods, devices, and computer-program products for determining an accuracy score for a device mapping system by processing media (e.g., video and/or audio data) being played by one or more devices. In some examples, the accuracy score can be based on a device map of the device mapping system. In such examples, the device map can purport to link devices that are associated together.

In some examples, the accuracy score can be further based on media content viewing data from an automated content recognition (ACR) system or other system that can determine media content being viewed by one or more media player devices. In some cases, the media content can include video content (which can include audio content) or audio content. The media content can be processed and analyzed (e.g., using an ACR system) to determine media content that is being viewed by one or more media player devices, which can be stored as viewing data. In one illustrative example when an ACR system is used to determine media content being viewed by a media player device, the media player device can decode video data (and, in some cases, audio data) associated with video programs. The media player device can place the decoded contents of each frame of the video into a video frame buffer in preparation for display or for further processing of pixel information of the video frames. The media player device can process the buffered video data and can produce unknown data points (which can be referred to as "cue points") representing an unknown video segment currently being played by the player device. A matching server can receive the unknown cue points, and can compare the unknown cue points with stored candidate cue points to determine a match between a candidate video segment and the unknown video segment.

The viewing data can then be processed to determine the accuracy score. In such examples, the media viewing data (sometimes referred to as viewing behavior) can indicate media content being played by a media player device. In some examples, the accuracy score can indicate whether the device mapping system is assigning similar categories to devices that have similar playback of media content. In such examples, the device map can be compared to device-category designations that are assigned based on randomness to determine an accuracy of the device mapping system. If the device map is determined to have a sufficiently low probability of being merely random in nature, the device mapping system can be determined to be accurate.

In some examples, the accuracy score can be used by the device mapping system to improve its process for generating the device map. For example, the device mapping system can modify one or more operations to attempt to improve the accuracy score.

In some examples, a system is provided that includes one or more processors and one or more non transitory machine readable storage media containing instructions that, when executed on the one or more processors, cause the one or more processors to perform operations. The operations include obtaining a plurality of categories assigned to groups of media player devices. The plurality of categories are determined using a device mapping system. A category includes a categorization for a group of the media player devices. The operations further include determining viewing behaviors of the groups of media player devices. The viewing behaviors are determined using automated content recognition by matching viewed media content viewed by the media player devices with stored media content. The operations further include determining a correlation between the plurality of categories and the viewing behaviors of the groups of media player devices, and determining an accuracy score for the device mapping system using the determined correlation. The operations further include assigning the accuracy score to the device mapping system, wherein the accuracy score is used to improve the device mapping system.

In some examples, a method is provided that includes obtaining a plurality of categories assigned to groups of media player devices. The plurality of categories are determined using a device mapping system. A category includes a categorization for a group of the media player devices. The method further includes determining viewing behaviors of the groups of media player devices. The viewing behaviors are determined using automated content recognition by matching viewed media content viewed by the media player devices with stored media content. The method further includes determining a correlation between the plurality of categories and the viewing behaviors of the groups of media player devices, and determining an accuracy score for the device mapping system using the determined correlation. The method further includes assigning the accuracy score to the device mapping system, wherein the accuracy score is used to improve the device mapping system.

In some examples, computer-program product tangibly embodied in a non-transitory machine-readable storage medium is provided that includes instructions that, when executed by the one or more processors, cause the one or more processors to: obtain a plurality of categories assigned to groups of media player devices, wherein the plurality of categories are determined using a device mapping system, and wherein a category includes a categorization for a group of the media player devices; determine viewing behaviors of the groups of media player devices, wherein the viewing behaviors are determined using automated content recognition by matching viewed media content viewed by the media player devices with stored media content; determine a correlation between the plurality of categories and the viewing behaviors of the groups of media player devices; determine an accuracy score for the device mapping system using the determined correlation; and assign the accuracy score to the device mapping system, wherein the accuracy score is used to improve the device mapping system.

In some aspects, the correlation between the plurality of categories and the viewing behaviors of the groups of media player devices is based on a variance in viewing behaviors among the plurality of categories.

In some aspects, determining the accuracy score for the device mapping system includes performing a statistical hypothesis test to determine whether the correlation between the plurality of categories and the viewing behaviors of the groups of media player devices is random.

In some aspects, the system, method, and computer-program product include comparing a result of the statistical hypothesis test to a randomness threshold, and determining the correlation is random when the result is less than the randomness threshold.

In some aspects, the accuracy score is determined for the device mapping system based on the comparison of the result of the statistical hypothesis test to the randomness threshold.

In some aspects, media content is video content, and performing the automated content recognition includes: receiving a pixel cue point associated with a frame of an unknown video segment, wherein the pixel cue point includes a set of pixel values corresponding to the frame; identifying a candidate reference data point in a database of reference data points, wherein the candidate reference data point is similar to the pixel cue point, and wherein the candidate reference data point includes one or more pixel values corresponding to a candidate frame of a candidate video segment; adding a token to a bin associated with the candidate reference data point and the candidate video segment; determining whether a number of tokens in the bin exceeds a value; and identifying the unknown video segment as matching the candidate video segment when the number of tokens in the bin exceeds the value.

In some aspects, the viewing behaviors include at least one or more of an amount of time of the groups of media player devices view one or more of a plurality of channels, incomes associated with users of the groups of media player devices, age groups of users of the groups of media player devices, education levels of users of the groups of media player devices, or numbers of devices in the groups of media player devices.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present invention are described in detail below with reference to the following drawing figures:

FIG. 3 illustrates an example of computing f-ratios for various sources;

FIG. 5 illustrates an example of a process for evaluating the statistical correlation of a plurality of devices to predicted statistical attributes;

FIG. 9 illustrates an example of a first match rate equating income codes versus viewing hours per month;

FIG. 10 illustrates an example of a second match equating income codes versus viewing hours per month; and FIG. 11 illustrates an example of media devices only found in data set two equating income code versus viewing hours per month.

DETAILED DESCRIPTION

Figure 1:
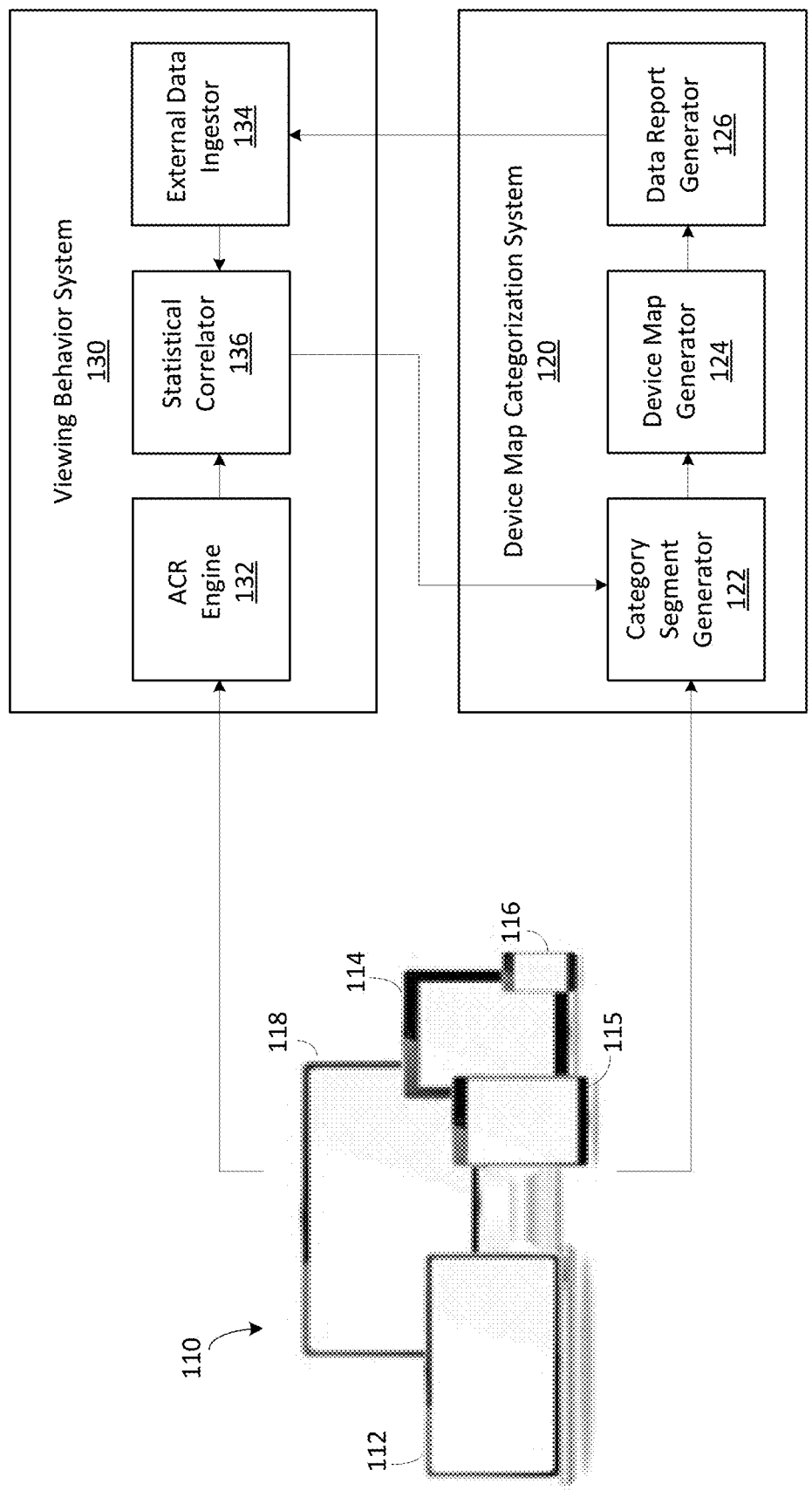
FIG. 1 illustrates an example of a system for updating a device map categorization system.

In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable storage medium or computer-readable storage medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, or other information may be passed, forwarded, or transmitted using any suitable means including memory sharing, message passing, token passing, network transmission, or other transmission technique.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Systems depicted in some of the figures may be provided in various configurations. In some embodiments, the systems may be configured as a distributed system where one or more components of the system are distributed across one or more networks in a cloud computing system.

Provided are methods, devices, and computer-program products for determining accuracy of device mapping systems. In some examples, an accuracy score can be determined for a device mapping system. In some cases, the accuracy score can be based on a device map of the device mapping system. In such cases, the device map can include information linking media player devices (also referred to as "devices" or "player devices" or "media devices") that are categorized or associated together. In some examples, a device (or "player device" or "media player device") can be defined as a network-connected device, such as a smartphone, tablet, smart TV, laptop, smart watch or other wearable device, or any other network-connected device (e.g., Internet-connected, broadband network connected, cellular network connected, or other network-connected device) that can receive and display media content. In some examples, the device map can be generated based on assigning one or more category segments (or "categories") to each device included in the device map. In such examples, category segments or categories can include demographic attributes, such as annual household income, age group, education level, number of television sets, and/or various preferences regarding entertainment choices, or any suitable combination thereof. However, it should be recognized that category segments or categories can be any logical group that can associate a plurality of devices together.

In some examples, the accuracy score can be further based on viewing data from an automated content recognition (ACR) component or other system that can determine media content being viewed by one or more media players. In some cases, the media content can include video content (which can include audio content) or audio content. The media content can be processed and analyzed (e.g., using an ACR system) to determine what media content is being viewed by one or more media players, which can be stored as viewing data. The viewing data can then be processed to determine the accuracy score. In such examples, the viewing data (sometimes referred to as viewing behavior) can indicate media content being played by a media player device. In some examples, the accuracy score can indicate whether the device mapping system is assigning similar categories to devices that have similar playback of media content. In such examples, the device map can be determined to be random, indicating that the device mapping system is inaccurate. In contrast, if the device map is determined to have a sufficiently low probability of being merely random in nature, the device mapping system can be determined to be accurate.

In some examples, the accuracy score can be used by the device mapping system to improve its process for generating the device map. For example, the device mapping system can modify one or more operations to attempt to improve the accuracy score.

FIG. 1 illustrates an example of a system for updating a device map categorization system 130 (sometimes referred to as a device mapping system). In some examples, the system can include one or more devices 110, the device map categorization system 120, a viewing behavior system 130, or any combination thereof. It should be recognized that one or more components of the system can be combined into less components or split into more components.

In some examples, data from the one or more devices 110 can be processed by one or more components of the system, including the device map categorization system 120 and the viewing behavior system 130. The one or more devices 110 can include laptops (e.g., laptop 112), tablets (e.g., a first tablet 114 or a second tablet 115), phones (e.g., smart phone 116), televisions (e.g., television 118), or any other network-connected device that can receive and display media content (e.g., auditory or visual content). In some examples, the one or more devices 110 can be included in one or more networks.

As described above, data from the one or more devices 110 can be processed by the device map categorization system 120. Processing can include assigning one or more category segments to each of the one or more devices 110 (e.g., using category segment generator 122), generating a device map for the one or more devices 110 (e.g., using device map generator 124), and generating a data report for the device map (e.g., using data report generator 126). In some examples, each device in the device map can be assigned at least one category segment (also referred to as a category). In such examples, an category segment assigned to the device can indicate that the device ranks above a threshold for one or more behaviors and/or one or more characteristics that are associated with the category segment. In some examples, the device map can indicate links or associations between a plurality of devices. Illustrative examples of the data from the one or more devices 110 can include cookies from browsers and IP addresses.

In some examples, the data report generator 126 can generate a data report of the device map and/or the one or more category segments. In such examples, the data report can include information for each of the one or more devices 110 and corresponding category segments. In one illustrative example, the data report can include information as to the type of device (such as differentiating a smart TV from a mobile tablet) to be used to differentiate TV program playback (e.g., broadcast TV, streaming TV, or other TV program). For example, it can be useful to determine if particular media content is being viewed on a television in a home or on a handheld device. There are many other uses for having information about category segments that are well known to the skilled person.

As described above, the one or more devices 110 can also be processed by the viewing behavior system 130. In some examples, the viewing behavior system 130 can include an automated content recognition (ACR) engine 132. The ACR engine 132 can identify media content (e.g., auditory or visual content) being displayed or played on a device (e.g., a device of the one or more devices 110). In such examples, the ACR engine 132 can also identify a channel or other metadata associated with the media content.

While there are many ways that media content can be identified, one method (described in more detail below with respect to FIG. 7) can include receiving a pixel cue point associated with a frame of an unknown video segment. In some examples, the pixel cue point can include a set of pixel values corresponding to the frame. The method can further include identifying a candidate reference data point in a database of reference data points. In some examples, the candidate reference data point can be similar to the pixel cue point. In such examples, the candidate reference data point can include one or more pixel values corresponding to a candidate frame of a candidate video segment. The method can further include adding a token to a bin associated with the candidate reference data point and the candidate video segment and determining whether a number of tokens in the bin exceeds a value. The method can further include identifying the unknown video segment as matching the candidate video segment when the number of tokens in the bin exceeds the value. The unknown video segment can then be identified as the candidate video segment, indicating that a media device is playing the candidate video segment.

Figure 7:
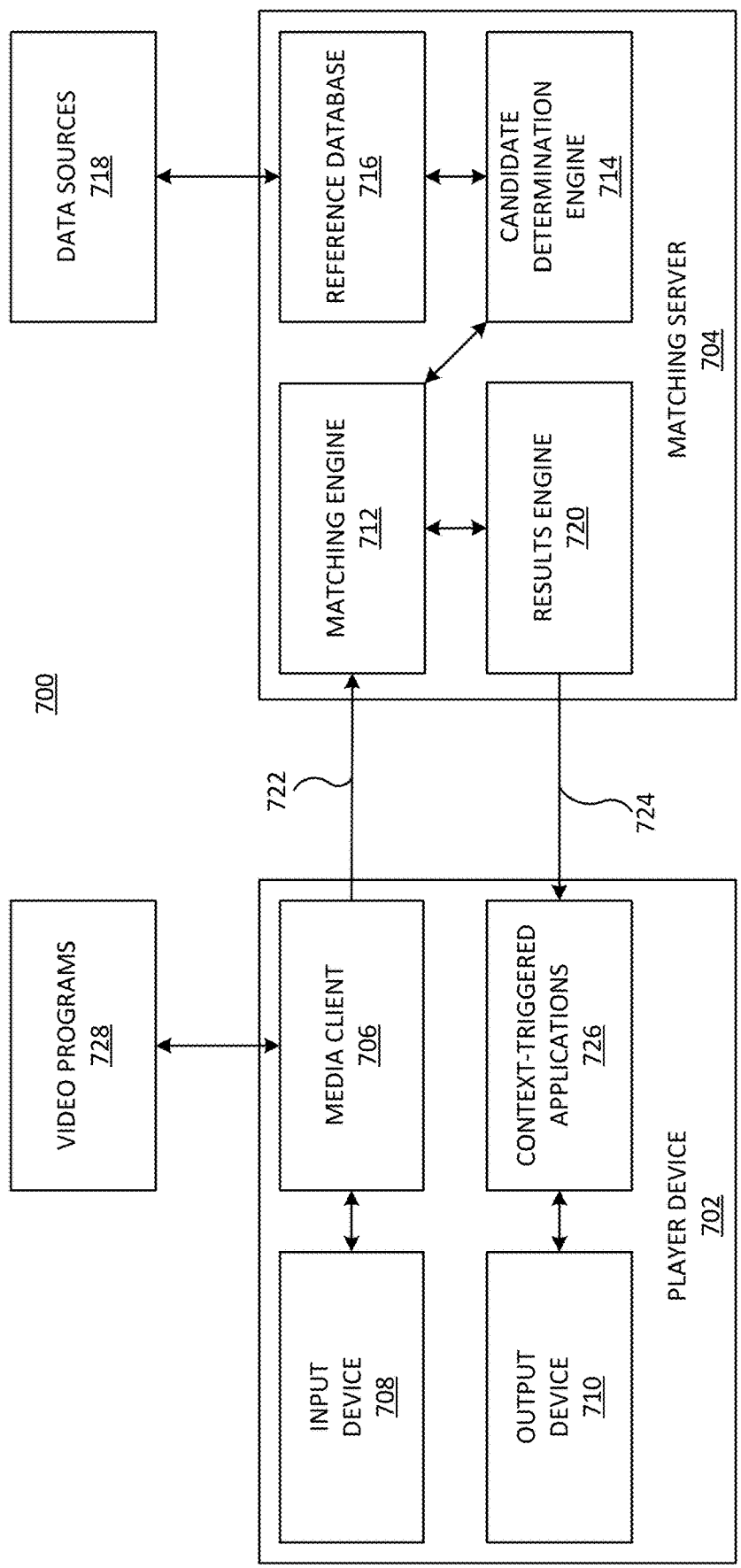
FIG. 7 illustrates an example of a block diagram of a matching system for identifying video content being viewed by a media system.

FIG. 7 illustrates an example of a block diagram of a matching system 700 (e.g., the ACR engine 132) for identifying video content being viewed by a media system. In some examples, the unknown content can include one or more unknown data points. In such examples, the matching system 700 can match unknown data points with reference data points to identify unknown video segments associated with the unknown data points. The reference data points can be included in a reference database 716.

The matching system 700 can include a player device 702 and a matching server 704 (e.g., an ACR engine). The player device 702 can include a media client 706, an input device 708, an output device 710, and one or more contextual applications 726. The media client 706 (which can be a television system, a computer system, or other electronic device capable of connecting to the Internet) can decode data (e.g., broadcast signals, data packets, or other frame data) associated with video programs 728. The media client 706 can place the decoded contents of each frame of the video into a video frame buffer in preparation for display or for further processing of pixel information of the video frames. In some examples, the player device 702 can be any electronic decoding system that can receive and decode a video signal. The player device 702 can receive video programs 728 and store video information in a video buffer (not shown). The player device 702 can process the video buffer information and produce unknown data points (which can be referred to as "cue points"). The media client 706 can transmit the unknown data points to the matching server 704 for comparison with reference data points in the reference database 716.

The input device 708 can include any suitable device that allows a request or other information to be input to the media client 706. For example, the input device 708 can include a keyboard, a mouse, a voice-recognition input device, a wireless interface for receiving wireless input from a wireless device (e.g., from a remote controller, a mobile device, or other suitable wireless device), or any other suitable input device. The output device 710 can include any suitable device that can present or otherwise output information, such as a display, a wireless interface for transmitting a wireless output to a wireless device (e.g., to a mobile device or other suitable wireless device), a printer, or other suitable output device.

The matching system 700 can begin a process of identifying a video segment by first collecting data samples from known video data sources 718. For example, the matching server 104 can collect data to build and maintain a reference database 716 from a variety of video data sources 718. The video data sources 718 can include media providers of television programs, movies, or any other suitable video source. Video data from the video data sources 718 can be provided as over-the-air broadcasts, as cable TV channels, as streaming sources from the Internet, and from any other video data source. In some examples, the matching server 704 can process the received video from the video data sources 718 to generate and collect reference video data points in the reference database 716, as described below. In some examples, video programs from video data sources 718 can be processed by a reference video program ingest system (not shown), which can produce the reference video data points and send them to the reference database 716 for storage. The reference data points can be used as described above to determine information that is then used to analyze unknown data points.

The matching server 704 can store reference video data points for each video program received for a period of time (e.g., a number of days, a number of weeks, a number of months, or any other suitable period of time) in the reference database 716. The matching server 704 can build and continuously or periodically update the reference database 716 of television programming samples (e.g., including reference data points, which may also be referred to as cues or cue values). In some examples, the data collected is a compressed representation of the video information sampled from periodic video frames (e.g., every fifth video frame, every tenth video frame, every fifteenth video frame, or other suitable number of frames). In some examples, a number of bytes of data per frame (e.g., 25 bytes, 50 bytes, 75 bytes, 100 bytes, or any other amount of bytes per frame) can be collected for each program source. Any number of program sources can be used to obtain video, such as 25 channels, 50 channels, 75 channels, 100 channels, 200 channels, or any other number of program sources.

The media client 706 can send a communication 722 to a matching engine 712 of the matching server 704. The communication 722 can include a request for the matching engine 712 to identify unknown content. For example, the unknown content can include one or more unknown data points and the reference database 716 can include a plurality of reference data points. The matching engine 712 can identify the unknown content by matching the unknown data points to reference data in the reference database 716. In some examples, the unknown content can include unknown video data being presented by a display (for video-based ACR), a search query (for a MapReduce system, a Bigtable system, or other data storage system), an unknown image of a face (for facial recognition), an unknown image of a pattern (for pattern recognition), or any other unknown data that can be matched against a database of reference data. The reference data points can be derived from data received from the video data sources 718. For example, data points can be extracted from the information provided from the video data sources 718 and can be indexed and stored in the reference database 716.

The matching engine 712 can send a request to the candidate determination engine 714 to determine candidate data points from the reference database 716. A candidate data point can be a reference data point that is a certain determined distance from the unknown data point. In some examples, a distance between a reference data point and an unknown data point can be determined by comparing one or more pixels (e.g., a single pixel, a value representing group of pixels (e.g., a mean, an average, a median, or other value), or other suitable number of pixels) of the reference data point with one or more pixels of the unknown data point. In some examples, a reference data point can be the certain determined distance from an unknown data point when the pixels at each sample location are within a particular pixel value range.

In one illustrative example, a pixel value of a pixel can include a red value, a green value, and a blue value (in a red-green-blue (RGB) color space). In such an example, a first pixel (or value representing a first group of pixels) can be compared to a second pixel (or value representing a second group of pixels) by comparing the corresponding red values, green values, and blue values respectively, and ensuring that the values are within a certain value range (e.g., within 0-5 values). For example, the first pixel can be matched with the second pixel when (1) a red value of the first pixel is within 5 values in a 0-255 value range (plus or minus) of a red value of the second pixel, (2) a green value of the first pixel is within 5 values in a 0-255 value range (plus or minus) of a green value of the second pixel, and (3) a blue value of the first pixel is within 5 values in a 0-255 value range (plus or minus) of a blue value of the second pixel. In such an example, a candidate data point is a reference data point that is an approximate match to the unknown data point, leading to multiple candidate data points (related to different media segments) being identified for the unknown data point. The candidate determination engine 714 can return the candidate data points to the matching engine 712.

For a candidate data point, the matching engine 712 can add a token into a bin that is associated with the candidate data point and that is assigned to an identified video segment from which the candidate data point is derived. A corresponding token can be added to all bins that correspond to identified candidate data points. As more unknown data points (corresponding to the unknown content being viewed) are received by the matching server 704 from the player device 702, a similar candidate data point determination process can be performed, and tokens can be added to the bins corresponding to identified candidate data points. Only one of the bins corresponds to the segment of the unknown video content being viewed, with the other bins corresponding to candidate data points that are matched due to similar data point values (e.g., having similar pixel color values), but that do not correspond to the actual segment being viewed. The bin for the unknown video content segment being viewed will have more tokens assigned to it than other bins for segments that are not being watched. For example, as more unknown data points are received, a larger number of reference data points that correspond to the bin are identified as candidate data points, leading to more tokens being added to the bin. Once a bin includes a particular number of tokens, the matching engine 712 can determine that the video segment associated with the bin is currently being displayed on the player device 702. A video segment can include an entire video program or a portion of the video program. For example, a video segment can be a video program, a scene of a video program, one or more frames of a video program, or any other portion of a video program. An example of a system for identifying media content is described in U.S. patent application Ser. No. 15/240,801, which is hereby incorporated by reference in its entirety, for all purposes.

Referring back to FIG. 1, in some examples, the ACR engine 132 can output an identification of the identified media content (e.g., a video segment being viewed by a media device). In such examples, the ACR engine 132 can send the identification of the media content, an identification of a device that the media content was received from, and any other metadata associated with the media content (e.g., a channel that the media content was being played on) to the statistical correlator 136.

Figure 2A:
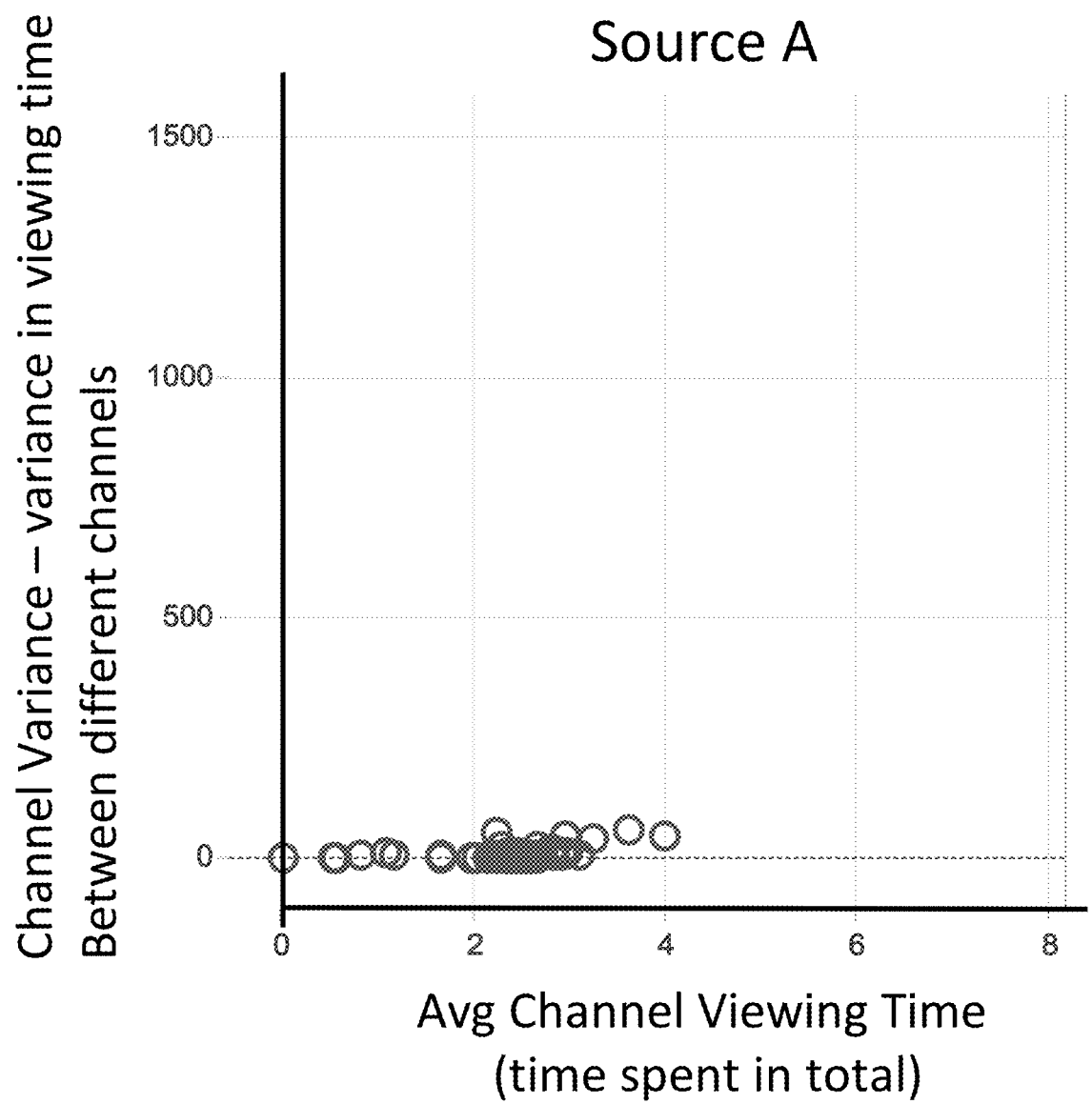
FIG. 2A illustrates an example of a graph comparing viewing time to channel variance for a first source.
Figure 2B:
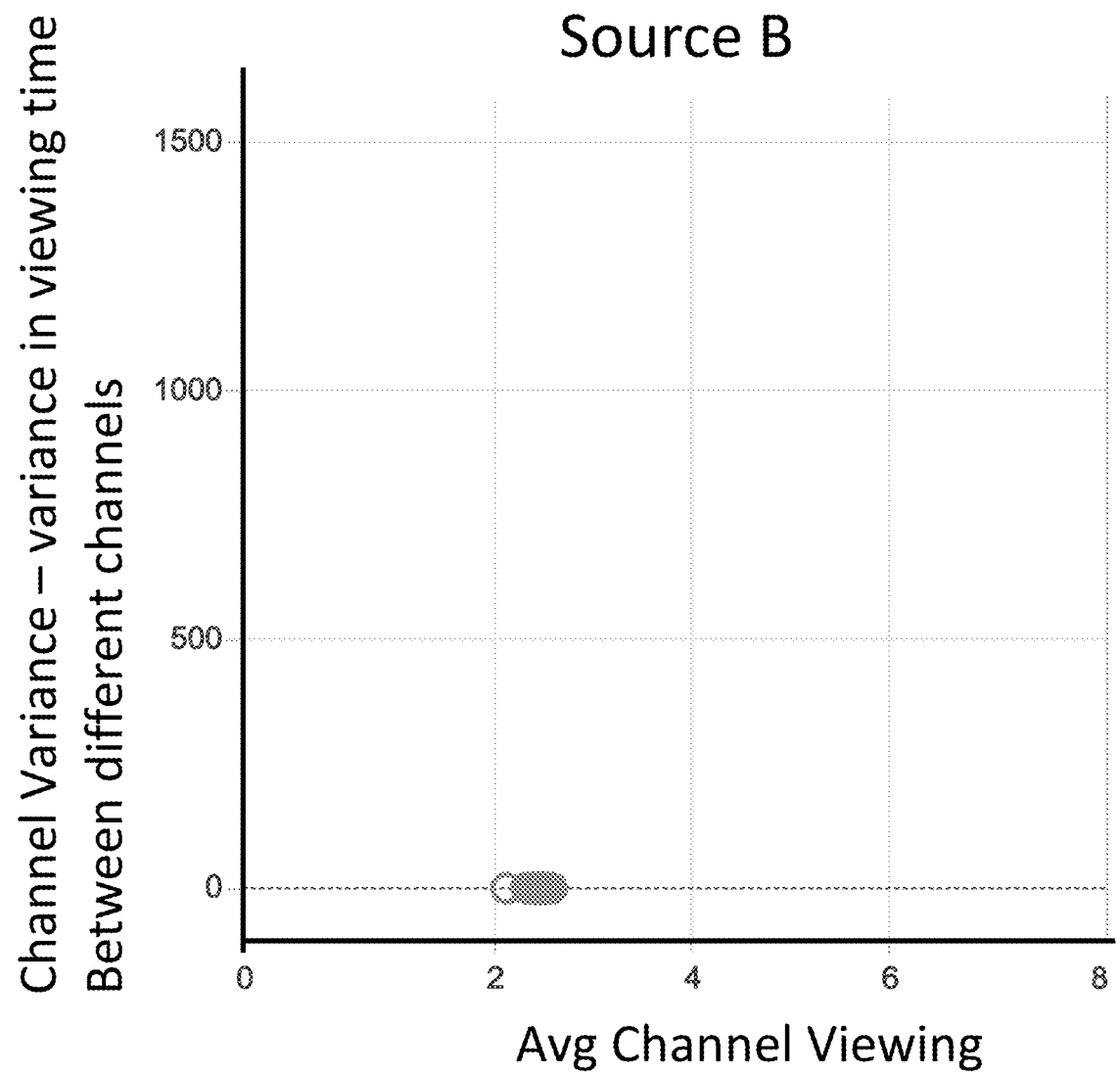
FIG. 2B illustrates an example of a graph comparing viewing time to channel variance for a second source.
Figure 2C:
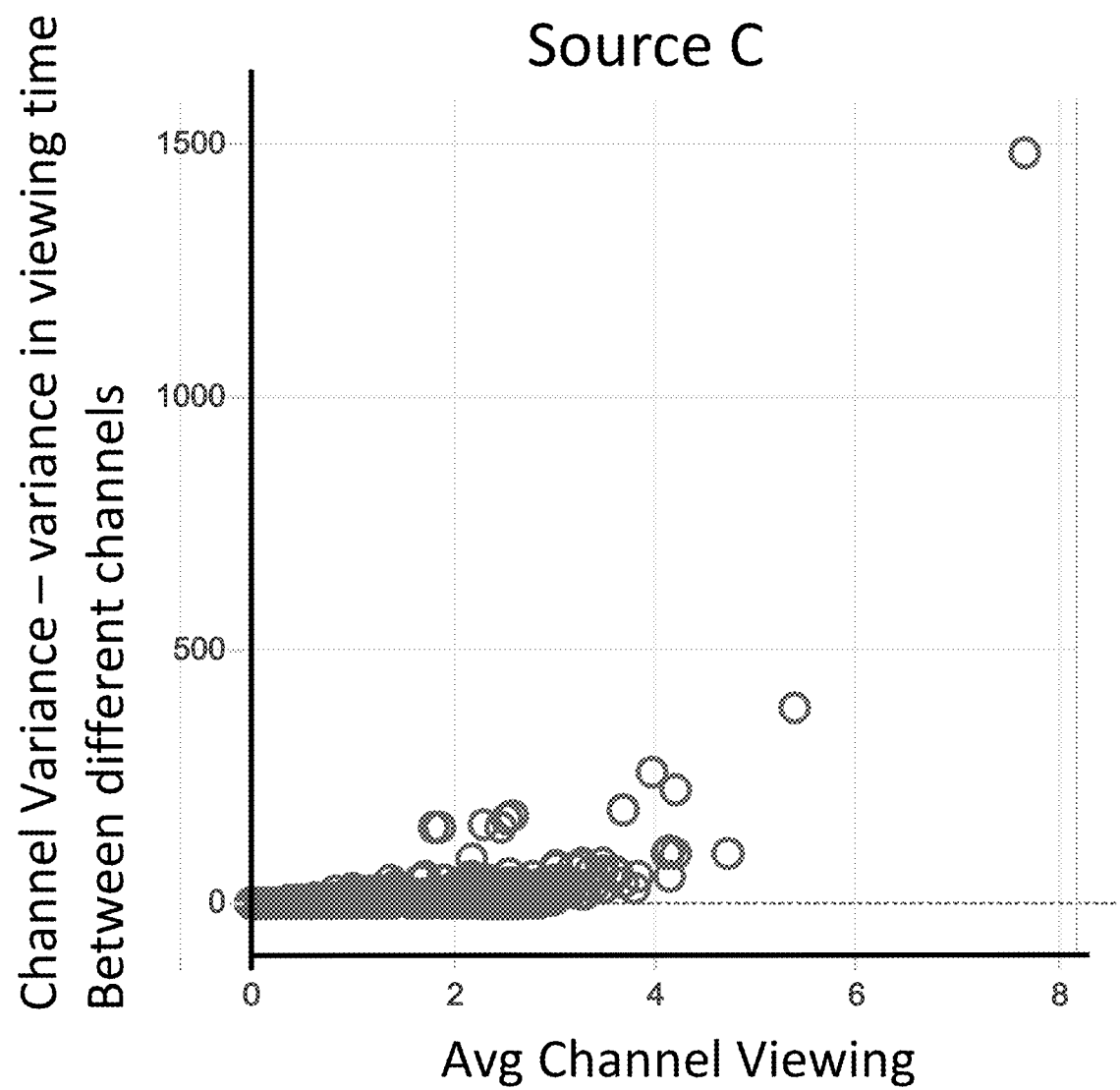
FIG. 2C illustrates an example of a graph comparing viewing time to channel variance for a third source.

In some examples, the statistical correlator 136 can evaluate the device map using the viewing data output from the ACR engine 132 to determine a correlation between the categories generated using the device map categorization system 120 and the viewing behaviors of the groups of devices assigned to the different categories. In some cases, the statistical correlator 136 can determine whether the device mapping system that generated the device map is accurate. FIGS. 2A, 2B, and 2C illustrate examples of graphs for different device mapping systems (e.g., Source A, Source B, and Source C).

In one illustrative example, a graph can include an x-axis for an average channel viewing time (i.e., time spent in total) and a y-axis for channel variance. In such examples, the channel variance can indicate a variance in viewing time between difference channels. In some examples, each point (e.g., a circle) on a graph can represent an category segment or category (e.g., as described above with the category segment generator 124). For example, when the category segment is for a household (e.g., a plurality of devices), a circle at (2, 10) can indicate that the household was active for 2 units of time (e.g., hours, minutes, seconds, etc.), and during which one or more channels were viewed for 10 units of time (e.g., hours, minutes, seconds, etc.) more than one or more other channels. For another example, when the category segment is for a device, a circle at (2, 10) can indicate that the device was active for 2 units of time (e.g., hours, minutes, seconds, etc.), and during which one or more channels were viewed for 10 units of time (e.g., hours minutes, seconds, etc.) more than one or more other channels.

While the examples shown in FIGS. 2A, 2B, and 2C include average channel viewing time and channel variance, one of ordinary skill will appreciate that any other viewing behavior other than channel viewing time (e.g., a type of viewing (such as digital video recording (DVR) viewing or video on demand (VOD) viewing) or a time that the viewing occurs) can be used by the statistical correlator 136.

In some examples, the statistical correlator 136 can perform a statistical evaluation of viewing data (e.g., viewing time of video segments) from the ACR engine 132 and the device map from the device map categorization system 120. The statistical evaluation can represent an accuracy of the predictions of the device map versus viewing data as detected by the ACR engine 132. For example, the statistical evaluation can indicate whether there is a correlation between devices with similar viewing data and the categories that were assigned to the devices. As another example, the statistical correlator 136 can determine how channel viewing varies between each category segment. It should be recognized that the statistical evaluation can be performed using any suitable statistical evaluation technique, including, for example, analysis of variance (ANOVA), chi-squared, f-test, t-test, any combination thereof, or the like. For illustrative purposes, ANOVA will be used as an example herein. However, one of ordinary skill will appreciate that any other suitable statistical evaluation test can be used by the statistical correlator 136 to determine a correlation.

ANOVA can be used to analyze differences between means (or averages) of logical groups. In some examples, a mean of information associated with the ACR engine 132 can be calculated for each category segment received from the device map categorization system 120. For example, for each device, a variance in viewing time between different channels can be calculated (e.g., as shown in FIGS. 2A, 2B, and 2C). For each category segment, the variance can be averaged across each device such that a mean variance is calculated. The mean variance can be the mean of information. In another example, a mean of information associated with the ACR engine 132 can be calculated for each household based on the composite device map for said household.

In some examples, ANOVA can compare two types of variances: the variance within each category segment and the variance between different category segments. To calculate the variances, a sum of squares (SS) between different category segments (referred to as a "SS between") can be computed: $SS_{between} = \Sigma n(\bar{x} - \bar{\bar{x}})^2$, where x-bar ($\bar{x}$) is an category segment mean and x-double-bar ($\bar{\bar{x}}$) is an overall mean. In some examples, a variance between different category segments (referred to as a "variance between") can be computed:

$$variance_{between} = \frac{\sum n(\bar{x} - \bar{\bar{x}})^2}{k - 1},$$

where k is a number of distinct samples. In some examples, a variance within each category segment (referred to as a "variance within") can also be computed: $SS_{within} = \Sigma\Sigma n(x - \bar{x})^2$. In one illustrative example, the following equation can be used to obtain the variance within:

$$variance_{within} = \frac{SS_{within}}{n - k}.$$

After the variance between and variance within are calculated, an F-ratio can be computed. The F-ratio can be based on the variance between and variance within:

$$F = \frac{variance_{between}}{variance_{within}}.$$

The F-ratio can indicate an amount of randomness with the data. In some examples, a critical value for the F-ratio can be identified such that when the F-value is less than the critical value, the device mapping system fails the test (i.e., the data is identified as random). FIG. 3 illustrates an example of calculating F-ratios for each of the sources described in FIGS. 2A, 2B, and 2C. As can be seen, the F-ratios in FIG. 3 indicate that Source C and Source A (from FIGS. 2A and 2C) pass the test with F>Fcrit and Source B (from FIG. 2B) fails the test. In some examples, the critical value can be adjusted depending on device mapping systems that are analyzed. In some examples, the lower the F-ratio is, the better the implied quality of the underlying match.

In some examples, the statistical correlator 126 can send a message to the category measure system 120 (e.g., to the category segment generator 122 or the device map generator 124). In such examples, the message can indicate whether the data report is satisfactory in light of media content from the one or more devices 110. In some examples, the data report can be satisfactory when it is determined that the categories do not appear to be random based on the statistical evaluation performed by the statistical correlator 136. Using this methodology to score device map systems, modifications to the device map systems can be identified and compared to other accuracy scores to determine progress of the modifications.

Figure 4:
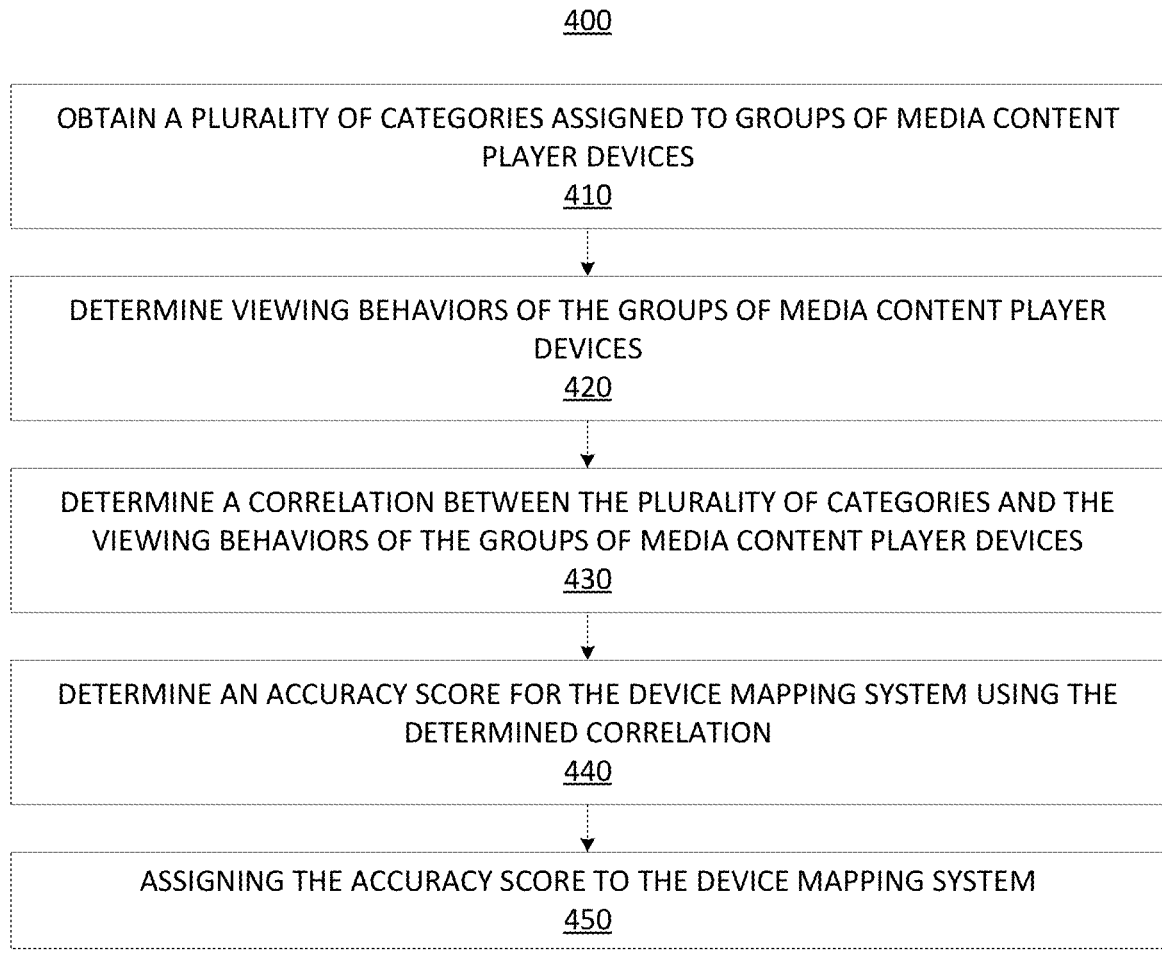
FIG. 4 illustrates an example of a process for assigning an accuracy score to a device map matching process.

FIG. 4 illustrates an example of a process 400 for assigning an accuracy score to a device mapping system. In some examples, the process 400 can be performed by a computer system.

Process 400 is illustrated as a logical flow diagram, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 400 can be performed under the control of one or more computer systems configured with executable instructions and can be implemented as code (e.g., executable instructions, one or more computer programs, or one or more applications) executing collectively on one or more processors, by hardware, or combinations thereof. As noted above, the code can be stored on a machine-readable storage medium, for example, in the form of a computer program comprising a plurality of instructions executable by one or more processors. The machine-readable storage medium can be non-transitory.

The process 400 can include obtaining a plurality of categories assigned to groups of media player devices (step 410). In some examples, the plurality of categories can be determined using a device mapping system. In such examples, a category can include a categorization for a group of media player devices (e.g., an category segment, a device segment, a viewing segment, or the like), such as: incomes associated with users of the groups of media player devices, age groups of users of the groups of media player devices, education levels of users of the groups of media player devices, or numbers of devices in the groups of media player devices. In some examples, a media player device can be a network-connected device that can receive and display media content. Examples of media player devices can include a smartphone, a tablet, a smart TV, a laptop, or any other suitable network-connected device.

The process 400 can further include determining viewing behaviors of the groups of media player devices (step 420). In some examples, the viewing behaviors can include at least one or more of an amount of time that the groups of media player devices view one or more of a plurality of channels, recorded programming (e.g., from a DVR), live programming, video-on-demand content, content from the Internet (e.g., YouTube or NetFlix), a specific programming type (e.g., sports or reality television), or any combination thereof. In some examples, the viewing behaviors can be determined using automated content recognition (ACR). For example, the ACR can match viewed media content viewed by the media player devices with stored media content. In such examples, media content can be auditory or visual (e.g., audio, video, or still image).

In examples where media content is video content, performing the automated content recognition can include receiving a pixel cue point associated with a frame of an unknown video segment, wherein the pixel cue point includes a set of pixel values corresponding to the frame; identifying a candidate reference data point in a database of reference data points, wherein the candidate reference data point is similar to the pixel cue point, and wherein the candidate reference data point includes one or more pixel values corresponding to a candidate frame of a candidate video segment; adding a token to a bin associated with the candidate reference data point and the candidate video segment; determining whether a number of tokens in the bin exceeds a value; and identifying the unknown video segment as matching the candidate video segment when the number of tokens in the bin exceeds the value.

The process 400 can further include determining a correlation between the plurality of categories and the viewing behaviors of the groups of media player devices (step 430). In some examples, the correlation between the plurality of categories and the viewing behaviors of the groups of media player devices can be based on a variance in viewing behavior among the plurality of categories.

The process 400 can further include determining an accuracy score for the device mapping system using the determined correlation (step 440). In some examples, determining the accuracy score of the device mapping system includes performing a statistical hypothesis test (e.g., such as the F-ratio test described above) to determine whether the correlation between the plurality of categories and the viewing behaviors of the groups of media player devices is random. In some examples, the process 300 can further include comparing a result of the statistical hypothesis test to a randomness threshold (sometimes reference to as a critical value) and determining the correlation is random when the result is less than the randomness threshold. In some examples, the accuracy score can be determined for the device mapping system based on the comparison of the result of the statistical hypothesis test to the randomness threshold.

The process 400 can further include assigning (or sending) the accuracy score to the device mapping system (step 450). In some examples, the accuracy score can be used to improve the device mapping system. For example, an optimization algorithm (such as hill climbing) can be used to compare an updated accuracy score to the accuracy score, where the updated accuracy score is determined after updating one or more parameters of the device mapping system.

FIG. 5 illustrates an example of a process 500 for evaluating the statistical correlation of a plurality of devices to predicted statistical attributes. In some examples, the process 500 can be performed by a computer system, such as the viewing behavior system 130.

Process 500 is illustrated as a logical flow diagram, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 500 can be performed under the control of one or more computer systems configured with executable instructions and can be implemented as code (e.g., executable instructions, one or more computer programs, or one or more applications) executing collectively on one or more processors, by hardware, or combinations thereof. As noted above, the code can be stored on a machine-readable storage medium, for example, in the form of a computer program comprising a plurality of instructions executable by one or more processors. The machine-readable storage medium can be non-transitory.

The process 500 can include calculating a value for each of one or more devices (step 510). In some examples, the value can be a number of hours that a device is tuned to each channel of one or more channels available to the device. In some examples, the one or more devices can be indicated by a device mapping system. In such examples, the device mapping system can provide an indication of the one or more devices and a particular category (sometimes referred to as an category segment) for each of the one or more devices.

The process 500 can further include performing a statistical analysis for the value for each of the one or more devices to identify how channel viewing varies between each segment indicated by the device mapping system (step 520). In some examples, the statistical analysis can be analysis of variance (ANOVA), chi-squared, f-test, t-test, or the like. If the statistical analysis is ANOVA, the process 500 can further include: determining that the segments are poorly identified by the device mapping system when there is a low amount of variance between the segments (step 530), determining that the segments correlate to viewing behaviors when there is a high amount of variance between the segments (step 540), and performing an F-test (or other suitable statistical analysis test or statistical hypothesis test) to determine whether there is a low amount or a high amount of variance between the segments.

Figure 6:
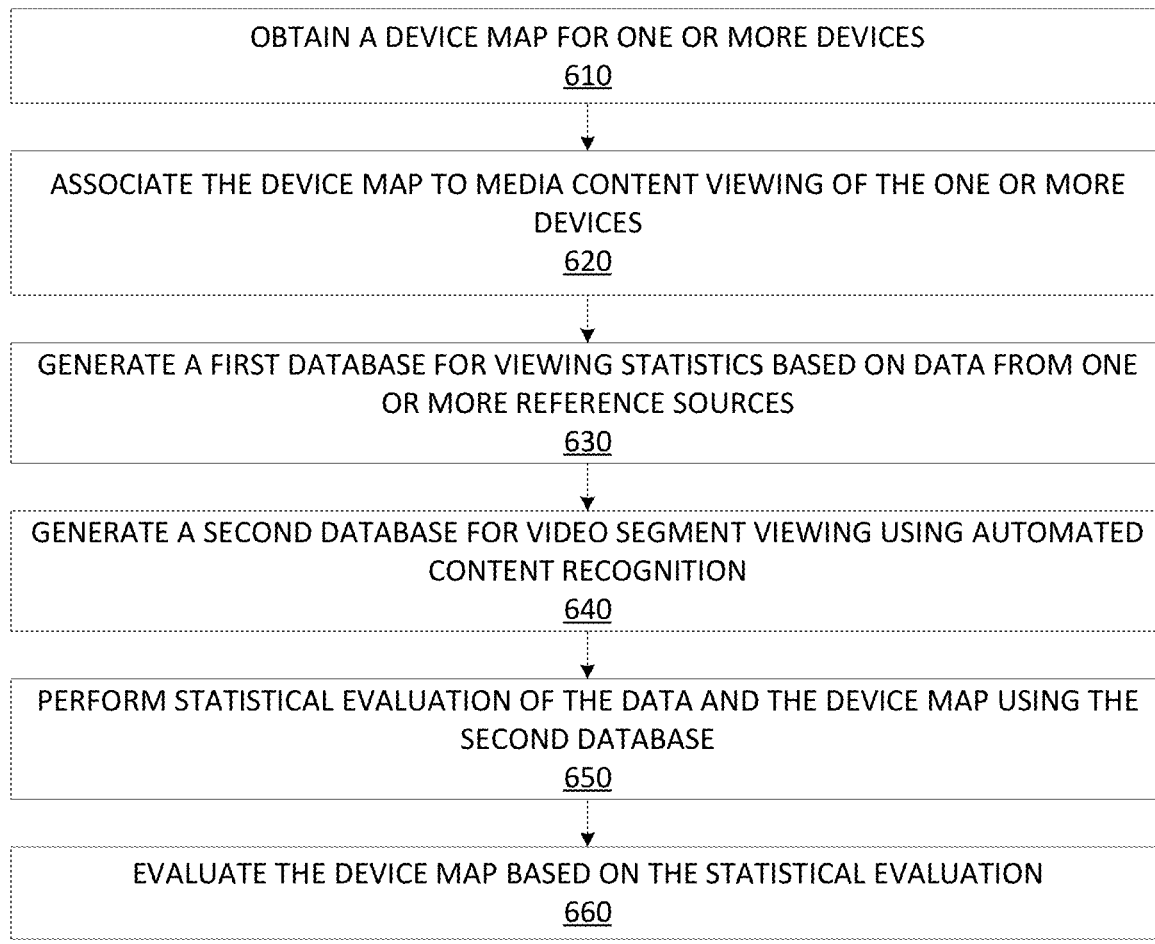
FIG. 6 illustrates an example of a process for comparing predicted viewing behavior to actual viewing as measured by an automatic content recognition component.

FIG. 6 illustrates an example of a process 600 for comparing predicted viewing behavior to actual viewing as measured by an automatic content recognition component.

In some examples, the process 600 can be performed by a computer system, such as the viewing behavior system 130.

Process 600 is illustrated as a logical flow diagram, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 600 can be performed under the control of one or more computer systems configured with executable instructions and can be implemented as code (e.g., executable instructions, one or more computer programs, or one or more applications) executing collectively on one or more processors, by hardware, or combinations thereof. As noted above, the code can be stored on a machine-readable storage medium, for example, in the form of a computer program comprising a plurality of instructions executable by one or more processors. The machine-readable storage medium can be non-transitory.

The process 600 can include obtaining a device map for one or more devices (step 610). In some examples, the one or more devices can each be media devices that make up a household. In some examples, the device map can be generated by a third-party system. In such examples, the device map can be generated based on raw data (e.g., internet protocol (IP) traffic such as use of a local area connection and/or the Internet, including time spent on email, Facebook, YouTube, or the like). In other examples, the raw data can be assembled by collecting browser data such as cookies and other data mining activities from the one or more devices.

In some examples, a request for the device map can include an indication of one or more devices that the device map should be based on. In other examples, the request can include the raw data. A person of ordinary skill in the art will recognize that the device map may be generated using proprietary processes, which is known in the art. Data used in generating a device map can be derived from analyzing cookies that collect on devices as a user accesses various Internet sites. In some examples, the type of Internet-connected device can be derived from remotely querying configuration information within a device.

The process 600 can further include associating (or mapping) the device map to media content viewing (step 620). In some examples, associating can include associating an IP address of the device map to an IP address of a device being monitored for media content viewing (using some form of content recognition). In such examples, associating can also include associating media content viewing detected from the device with the IP address of the device map. An example of associating a device map to media content viewing would be where a device map predicts that the associated household likes culinary things because they search websites that feature food recipes and kitchen tools which then maps to their TV viewing of the Food channel.

The process 600 can further include generating a first database for viewing statistics based on data from one or more reference sources (e.g., one or more devices such as a television in a home) (step 630). In some examples, the first database can be generated by a third party using proprietary processes of associating Internet activity gathered from one or more devices of a device map. In such examples, the proprietary processes do not use actual viewing records. In some examples, the first database can be used to associate viewer interest with media content viewing. For example, the first database can associate media content viewing with product interest, such as specific automobile brands.

The process 600 can further include generating a second database for video segment viewing using automated content recognition (step 640). In some examples, the automated content recognition can identify media content being viewed on one or more media devices (as described herein). The identified media content can be analyzed to determine what is being viewed by the one or more media devices. Based on what is being viewed, the second database can be generated to include information on viewing behavior of the one or more devices.

The process 600 further includes performing a statistical evaluation (e.g., a statistical correlation as described above) using the first database and the second database (step 650). In some examples, the statistical evaluation can compare the first database and the second database.

The process 600 further includes evaluating the device map based on the statistical evaluation (step 660). For example, if the statistical evaluation indicates that one or more category segments were selected randomly, the device map can be determined to be inadequate. However, if the statistical evaluation indicates that one or more category segments correlate with viewing behavior, the device map can be determined to be accurate. In some examples, the process 600 can be recursive such that when step 660 ends, the process 600 can repeat steps 630, 640, 650, and 660.

Figure 8:
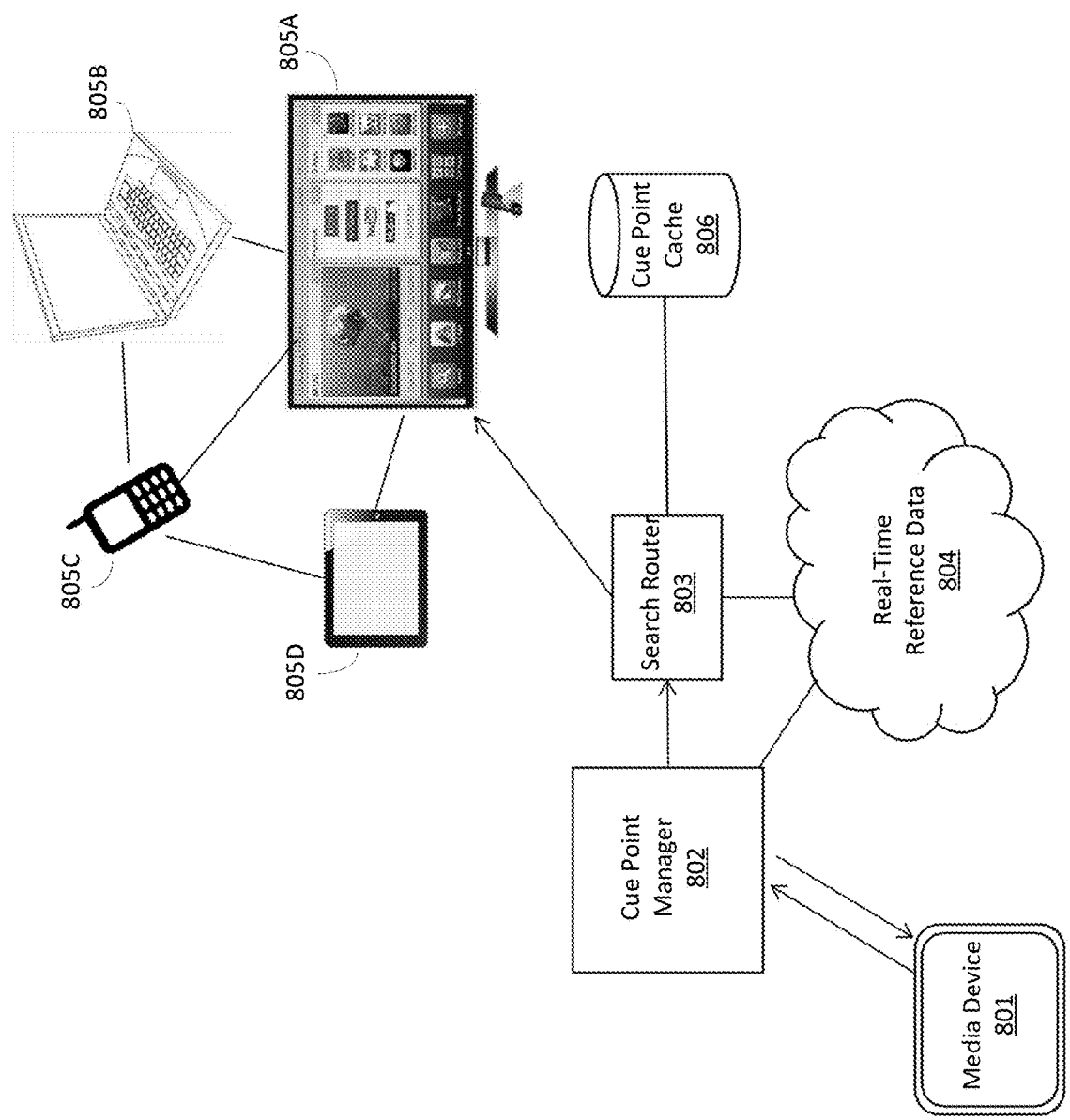
FIG. 8 illustrates an example of a process flow for various devices.

FIG. 8 illustrates an example of a process flow for various devices. In some examples, the process flow can include a media device 801. The media device 801 can generate cue point data (sometimes referred to as a fingerprint) of video programming currently being displayed on the media display 801. The media device 801 can send the cue point data to cue point manager 802. The cue point manager 802 can process and/or identify what is being displayed on the media display 801 using the cue point data and an automatic content recognition system (as described herein).

In some examples, the process flow can further include a cue point cache 806. The cue point cache 806 can be a storage device for supporting ingest (storage) of cue point data. The process flow can further include a real-time reference database 804. The real-time reference database 804 can be a database of television programming currently available on one or more television channels. The real-time reference database 804 can gather and process the one or more television channels for the purpose of comparison to the cue point data from the media device 801 for identifying video segments currently being displayed on the media device 801.

In some examples, the process flow can further include a search router 803. The search router 803 can accept device map information for one or more devices in a household (such as devices 805A, 805B, 805C, and 805D) for the purpose of correlating the device map information with viewing information from the media device 801.

FIGS. 9-11 illustrate examples of charts that represent an association of household income to TV viewing hours per month. The charts are each from a different vendor and are correlated against TV viewing as learned from direct measurement of an ACR system to test the quality of data from each vendor.

FIG. 9 illustrates an example of a first match rate of 47% equating income codes versus viewing hours per month. As can be seen, a probability that the two factors are unrelated is small at 9×10^−17. The probability indicates that the match process is likely good.

FIG. 10 illustrates an example of a second match of 62% equating income codes versus viewing hours per month. As can be seen, a probability that the two factors are unrelated has gone down by three orders of magnitude in comparison to FIG. 9. Therefore, the second match in totality has reduced randomness in the system and is better than the first (the lower the score the better).

FIG. 11 illustrates an example of media devices only found in data set two equating income code versus viewing hours per month.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive. In addition, while systems have been described, it should be recognized that a system can be one or more servers. In addition, the ACR engine 132, the statistical correlator 136, the external data ingestor 134, the category segment generator 122, the device map generator 124, the data report generator 126, the device mapping system, the viewing behavior system 130, the device map categorization system 120, or the like can be implemented by one or more servers.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

While illustrative embodiments of the application have been described in detail herein, it is to be understood that the inventive concepts may be otherwise variously embodied and employed, and that the appended claims are intended to be construed to include such variations, except as limited by the prior art.

What is claimed is:

1. A system comprising:
one or more processors; and
one or more non-transitory machine-readable storage media containing instructions that, when executed on the one or more processors, cause the one or more processors to perform operations including:
determining, for each device identified in a device map, a quantity of time that each device was tuned to each channel of a plurality of channels;
executing a statistical analysis using the quantity of time determined for each device identified in the device map, wherein the statistical analysis generates a variance value indicating a channel tuning variance between each category segment of a plurality of category segments, wherein each category segment represents a logical group that associates a plurality of devices together; and
determining whether the plurality of category segments correlate to viewing behaviors based on a comparison of the variance value relative to a threshold, wherein one or more operations associated with the device map are modified based on determining whether the plurality of category segments correlate to the viewing behaviors.

2. The system of claim 1, wherein the operations further include:
determining, based on a determination that the variance value is greater than the threshold, that the plurality of category segments correlate to viewing behaviors.

3. The system of claim 1, wherein the quantity of time is determined using automated content recognition by matching viewed media content viewed by each device identified in the device map with stored media content.

4. The system of claim 1, wherein the operations further include:
executing an f-test, wherein the f-test indicates whether there is a high amount of variance between category segments or a low amount of variance between category segments.

5. The system of claim 1, wherein each device identified in the device map is associated with a category segment of the plurality of category segments, and wherein the variance value indicates whether the category segment assigned to a particular device correlates with the quantity of time the particular device was tuned to one or more channels.

6. The system of claim 1, wherein the operations further include:
determining an accuracy score that indicates an accuracy of a device mapping system in assigning category segments to devices of the device map.

7. A method comprising:
determining, for each device identified in a device map, a quantity of time that each device was tuned to each channel of a plurality of channels;
executing a statistical analysis using the quantity of time determined for each device identified in the device map, wherein the statistical analysis generates a variance value indicating a channel tuning variance between each category segment of a plurality of category segments, wherein each category segment represents a logical group that associates a plurality of devices together; and determining whether the plurality of category segments correlate to viewing behaviors based on a comparison of the variance value relative to a threshold, wherein one or more operations associated with the device map are modified based on determining whether the plurality of category segments correlate to the viewing behaviors.

8. The method of claim 7, further comprising:
determining, based on a determination that the variance value is greater than the threshold, that the plurality of category segments correlate to viewing behaviors.

9. The method of claim 7, wherein the quantity of time is determined using automated content recognition by matching viewed media content viewed by each device identified in the device map with stored media content.

10. The method of claim 7, further comprising:
executing an f-test, wherein the f-test indicates whether there is a high amount of variance between category segments or a low amount of variance between category segments.

11. The method of claim 7, wherein each device identified in the device map is associated with a category segment of the plurality of category segments, and wherein the variance value indicates whether the category segment assigned to a particular device correlates with the quantity of time the particular device was tuned to one or more channels.

12. The method of claim 7, further comprising:
determining an accuracy score that indicates an accuracy of a device mapping system in assigning category segments to devices of the device map.

13. A computer-program product tangibly embodied in a non-transitory machine-readable storage medium including instructions that, when executed on one or more processors, cause the one or more processors to perform operations including:
determining, for each device identified in a device map, a quantity of time that each device was tuned to each channel of a plurality of channels;
executing a statistical analysis using the quantity of time determined for each device identified in the device map, wherein the statistical analysis generates a variance value indicating a channel tuning variance between each category segment of a plurality of category segments, wherein each category segment represents a logical group that associates a plurality of devices together; and
determining whether the plurality of category segments correlate to viewing behaviors based on a comparison of the variance value relative to a threshold, wherein one or more operations associated with the device map are modified based on determining whether the plurality of category segments correlate to the viewing behaviors.

14. The computer-program product of claim 13, wherein the operations further include:
determining, based on a determination that the variance value is greater than the threshold, that the plurality of category segments correlate to viewing behaviors.

15. The computer-program product of claim 13, wherein the operations further include:
executing an f-test, wherein the f-test indicates whether there is a high amount of variance between category segments or a low amount of variance between category segments.

16. The computer-program product of claim 13, wherein each device identified in the device map is associated with a category segment of the plurality of category segments, and wherein the variance value indicates whether the category segment assigned to a particular device correlates with the quantity of time the particular device was tuned to one or more channels.

17. The computer-program product of claim 13, wherein the operations further include:
determining an accuracy score that indicates an accuracy of a device mapping system in assigning category segments to devices of the device map.

* * * * *